Figure 1:
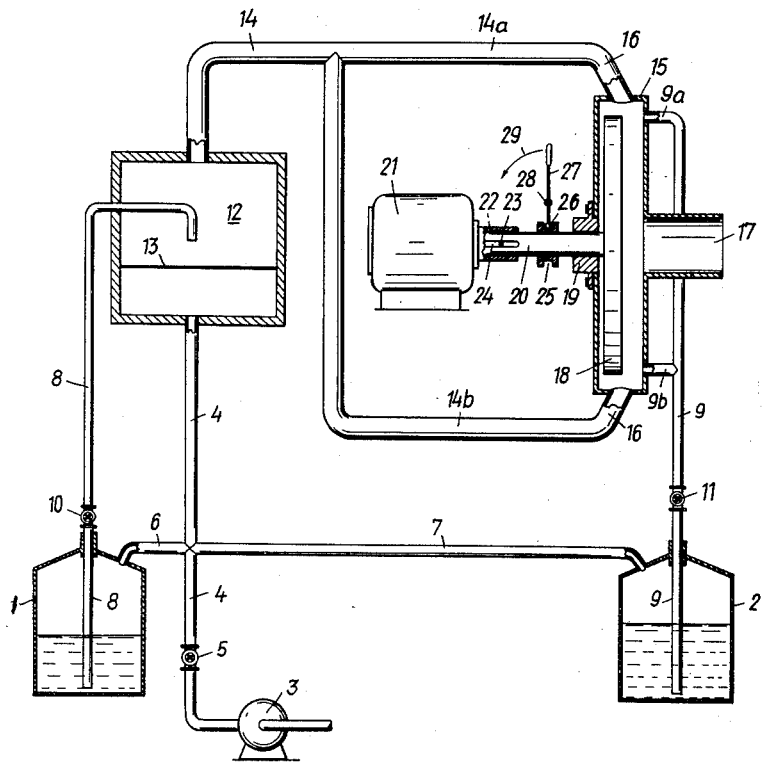

Sept. 22, 1964     O. A. VIELI     3,150,108
METHOD OF MAKING A UREA-FORMALDEHYDE RESIN FOAM
Filed March 22, 1960     2 Sheets-Sheet 1

INVENTOR:
Otto Anton Vieli,

BY
ATTORNEY.

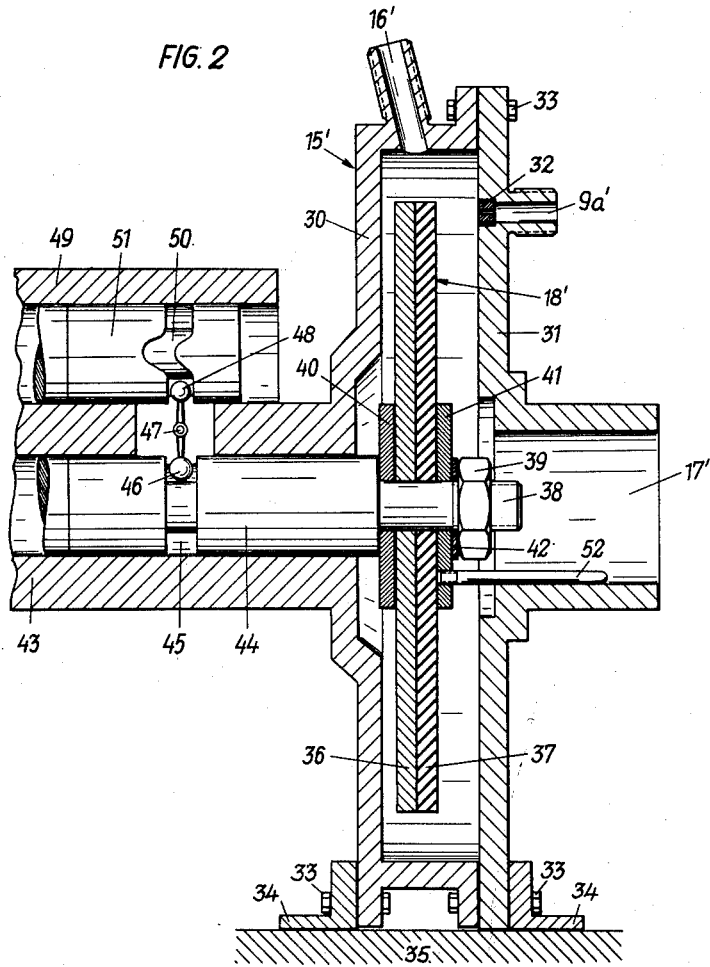

United States Patent Office 3,150,108
Patented Sept. 22, 1964

3,150,108
METHOD OF MAKING A UREA-FORMALDE-
HYDE RESIN FOAM
Otto Anton Vieli, Rhaezuens, Switzerland, assignor to
Dr. Werner H. Kreidl, New York, N.Y.
Filed Mar. 22, 1960, Ser. No. 16,669
Claims priority, application Switzerland, Mar. 24, 1959,
71,231
2 Claims. (Cl. 260—2.5)

The present invention relates to the continuous production of a synthetic resin foam from three components, these three components being constituted by a resin solution, a hardening agent and a foaming agent, by pneumatically foaming the foaming agent together with one of the other two components, pressure-relieving the foamed mixture thus obtained and adding the third component during that period in which the foamed mixture is pressure-relieved. In such a process either the foaming agent may be foamed up together with the resin solution, and the hardening agent added to the mixture thus obtained, or the foaming agent may be foamed up together with the hardening agent and the synthetic resin solution added to the resulting mixture. In some cases, especially when the synthetic resin solution is rather viscous, due to low temperatures, or when this solution is not completely homogeneous, the latter method is preferred in order to prevent the difficulties which arise, when the resin is forced through the foaming apparatus which contains some porous material. It is therefore to be understood that, although the first alternative, i.e., foaming up the foaming agent together with the resin solution and adding the hardening agent to the resulting foam, is referred to in this specification, this is no limitation of the present invention.

For satisfactorily producing such synthetic resin foams, the intimate mixing of the third component with the foamed mixture obtained by foaming the foaming agent together with one of the other two components is of great importance. If the third component were not intimately admixed to the foamed mixture, the hardening process would not show the required uniformity, one part of the resin hardening at a higher rate than the other part.

The resin or hardening agent, respectively, is foamed in aqueous solution in order to achieve an intimate mixture of the three components. The water content also favours the formation of very fine and uniform bubbles. On the other hand, however, the water content is a disadvantage, since, due to this water content, the foam has to be stored for a certain period before it is ready for further processing. The higher is the water content, the longer is this storage period. A further disadvantage of the known foaming methods is the fact that, in spite of thorough mixing, a relatively large amount of hardening agent is required in order to obtain uniform condensation, without excessively long storage.

It is an object of the present invention to avoid the above-mentioned disadvantages and to propose a continuous process for the production of a synthetic resin foam by which it is possible to materially reduce the quantity of hardening agent without running the risk of producing a foam of inferior quality due to unsatisfactory hardening.

The invention further aims at a process by means of which a resin foam can be produced the humidity of which is lower than that of foams produced in accordance with known processes.

The process according to the present invention for the production of a synthetic resin foam from three components constituted by a resin solution, a hardening agent and a foaming agent, comprises foaming the foaming agent together with one of the other two components, pressure-relieving the foamed mixture thus obtained while adding the third component, and subjecting the foam to the action of centrifugal forces during the course of the pressure relief. When working according to this process, the third component, the specific weight of which is higher than that of the foamed mixture, is subjected to a greater extent to the outwardly directed centrifugal forces than is the foamed mixture whereby a relative movement between the third component (e.g. the hardening agent) and the foamed mixture (e.g. the foamed resin solution) and an improved contact between these two will result. Due to this, a predetermined quantity of hardening agent will come into better contact with the resin than is the case with the known methods.

A preferred embodiment of the present invention is characterized by the fact that the direction of flow of the foam is, at least temporarily, opposite to the direction of the centrifugal forces. This further improves the mixing effect.

The present invention is primarily suited for, but not limited to the production of urea-formaldehyde foams. Generally speaking all aminoplastic resins and all phenoplastic resins, e.g., phenol-formaldehyde resins, may be used.

The hardening agent used may be any of the usual hardening agents, e.g., acids. The type of hardening agent depends upon the type of the resin. In the case of a urea-formaldehyde-resin solution, phosphoric acid may be used with advantage as the hardening agent.

Any of the known foaming agents, e.g., alkyl sulfonates may be used.

The present invention also relates to an apparatus for the production of a synthetic resin foam from three components which are constituted by a resin solution, a hardening agent and a foaming agent. This apparatus is mainly characterized by a housing which contains means for producing centrifugal forces, by at least one opening in said housing, for introducing the foamed mixture of the foaming agent and one of the other two components, by at least one opening in said housing for introducing the third component, and by one opening for the delivery of the foam from the interior of said housing.

In a preferred embodiment of the invention, the means for producing centrifugal forces is formed by one or more disks rotatingly arranged in said housing.

The openings for introducing the foamed mixture of the foaming agent and one of the other two components and the openings for introducing the third component are arranged in the housing preferably near the peripheral region of the disk, while the opening for the delivery of the foam from the interior of the housing is provided near the central portion of the disk. Due to this arrangement the foam is forced to move in a direction opposite to the direction of the action of the centrifugal forces, which tend to force the foam radially outwardly. In order to provide automatic cleaning of the interior of the housing, the disk or other centrifugal means is periodically displaced within the housing along the axis of rotation of the disk.

In the accompanying drawings there are shown embodiments of the present invention.

FIG. 1 is a sectional diagrammatic view showing the overall arrangement of an apparatus according to the invention, FIG. 2 shows a modification of the arrangement of the centrifugal means.

Two containers are designated in FIG. 1 by the numerals 1 and 2. These containers form reservoirs for the three components for producing a synthetic resin foam. In the embodiment shown in FIG. 1 the container 1 contains a mixture of a synthetic resin solution, e.g. a urea-formaldehyde solution, and a foaming agent e.g. an alcohol sulfonate, while the container 2 contains a hardening agent, e.g. phosphoric acid. If desired, the one component of the mixture contained in container 1 may be formed by the hardening agent, in which case the resin solution is stored in container 2. 3 is an air pump by means of which air is compressed. The compressed air is led through lines 4, 6 and 7 into a foaming vessel 12, into the space above the level of the mixture contained in container 1 and into the space above the level of the hardening agent contained in container 2, respectively. The flow of the compressed air can be shut off by means of a valve 5. Due to the pressure acting on the liquids in the containers 1 and 2, these liquids are forced up through the lines 8 and 9, respectively. 10 and 11 are valves for shutting off or throttling the flow of the liquids in the lines 8 and 9, respectively. The mixture of synthetic resin solution and foaming agent enters the foaming vessel 12 above a porous or perforated plate 13 through the pores or perforations of which the compressed air entering the foaming vessel 12 penetrates into the upper space of this vessel. The liquid entering through line 8 is foamed up by the air bubbles forced through the plate 13. The foamed mixture thus obtained flows through line 14 and the branches 14a and 14b. Through extensions 16 of these branch lines the foamed mixture is led into a mixing chamber 15. The connections of the extensions 16 are arranged around the circumference of the cylindrically shaped chamber 15. Although only two branches 14a and 14b and extensions 16 are shown in the drawing, the number of such branches and extensions is not limited. The connections of the extensions 16 are suitably arranged at equal interspaces around the circumference of chamber 15. The central region of one wall of the chamber 15 is provided with an opening 17 through which the foam produced by mixing the foamed mixture with the hardening agent is delivered.

The hardening agent from container 2 is forced through line 9 and branches 9a and 9b, into the chamber 15 where it is intimately mixed with the foamed mixture of resin solution and foaming agent. The good mixing action is based on the centrifugal forces generated by a disk 18 rotating within the chamber 15 and the different specific weights of the foamed mixture and the hardening agent. On account of the fact that the hardening agent, the specific weight of which is higher than that of the foamed mixture of resin solution and foaming agent, is subjected to the centrifugal forces to a greater extent that the foamed mixture, a relative movement of the hardening agent with respect to the foamed mixture is originated, which movement greatly improves the mixing effect.

The disk 18 is rotated by means of a shaft 20 entering the chamber through a bushing 19. The shaft 20 is powered by an electric motor 21 provided with a hollow shaft 22 which accommodates one end of the driven shaft 20. Positive rotation of shaft 20 is secured by means of a pin or pins 23 on the shaft 22 in engagement with a slot or slots 24 in the shaft 20. On account of this slot and pin arrangement the shaft 20 is axially displaceable together with the disk 18. Shaft 20 is provided with a collar arrangement 25 which is in engagement with one arm 26 of a two-armed lever the other arm of which is formed by a handle 27 for manual operation. The lever is pivoted at 28. By shifting the handle 27, shaft 20 and disk 18 are axially displaced within the housing 15 to the left or right. Periodical displacement of the disk 18 prevents the accumulation of hardened material on the inner walls of housing 15.

Reference is now made to FIG. 2 which shows a modification of the arrangement of the means producing the centrifugal forces. The housing 15' is provided with screw connections 16' for introducing the foamed mixture of the resin solution and the foaming agent, and with screw connections 9a for introducing the hardening agent, only one of each of these connections being shown in the drawing. The housing 15' is formed by two housing members 30 and 31. The member 31 is provided with the opening 17' for the delivery of the foam. 32 is an adjusting screw for adjusting the flow of the hardening agent. Members 30 and 31 are secured together by means of bolts 33, and mounted on the ground 35 by means of sections 34. The means 18' for producing centrifugal forces is formed by two disks 36 and 37, the one of which, 36, is made of metal while the other, 37, is made of rubber. These two disks are secured by means of a bolt 38, nut 39 and washers 40, 41 and 42.

The housing member 30 is provided with a hollow extension 43 which accommodates shaft 44 which is provided with an annular recess 45. One arm 46 of a two-armed lever, which is pivoted at 47, is in engagement with the recess 45. The second arm 48 of this lever is in engagement with a curved recess 50 of a shaft 51 which is parallel to shaft 44 and accommodated in member 49. Shaft 44 is rotated by an electric motor corresponding to the electric motor 21 of FIG. 1. Shaft 51 is also powered by electric motor 21, a reduction gear (not shown in the drawing) being provided between shafts 44 and 51. This reduction gear is designed in such a manner that the speed of shaft 51 is 1 r.p.m. when shaft 44 rotates at 500 or 600 r.p.m. The curved recess 50 periodically displaces the disk arrangement 18 within the housing 15' thus preventing the accumulation of hardened foam on the inner walls of the housing.

52 is a wiping member which is eccentrically mounted on the center region of the disk arrangement 18', to wipe off any hardened foam on the inside of opening 17'.

Without departing from the spirit of the present invention, numerous modifications may be made on the apparatus described and shown in the drawings. One example of such modification is the arrangement of the openings 16' which may also be arranged in or near the central portion of the housing member 30, i.e. in closer vicinity to the shaft 44.

What I claim is:

1. In a process for the production of a urea-formaldehyde resin foam, the steps comprising
    frothing under pressure an aqueous solution of a foaming agent for a urea-formaldehyde-resin solution together with a hardening agent for said resin solution,
    pressure-relieving the foamed mixture thus obtained while adding said urea-formaldehyde-resin solution, and
    subjecting the foam to the action of centrifugal forces of from 500 to 600 r.p.m. during the course of the pressure relief.

2. A process as claimed in claim 1, wherein the direction of flow of the foam is, at least temporarily, opposite to the direction of the centrifugal forces.

References Cited in the file of this patent
UNITED STATES PATENTS

| | | |
|---|---|---|
| 1,492,498 | Wait | Apr. 9, 1924 |
| 2,076,295 | Curs et al. | Apr. 6, 1937 |
| 2,500,295 | Peirce | Mar. 14, 1950 |
| 2,559,891 | Meyer | July 10, 1951 |
| 2,643,233 | Bennett et al. | June 23, 1953 |
| 2,813,780 | Vieli | Nov. 19, 1957 |